(12) United States Patent
Yamazaki et al.

(10) Patent No.: US 6,930,275 B2
(45) Date of Patent: Aug. 16, 2005

(54) THREE DIMENSIONAL LINEAR MACHINING APPARATUS

(75) Inventors: Tsunehiko Yamazaki, Aichi-ken (JP); Naoomi Miyagawa, Gifu-ken (JP); Toshihiko Inoue, Aichi-ken (JP)

(73) Assignee: Yamazaki Mazak Kabushiki Kaisha, Aichi-ken (JP)

( * ) Notice: Subject to any disclaimer, the term of this patent is extended or adjusted under 35 U.S.C. 154(b) by 129 days.

(21) Appl. No.: 10/412,907

(22) Filed: Apr. 14, 2003

(65) Prior Publication Data
US 2003/0192867 A1 Oct. 16, 2003

(30) Foreign Application Priority Data
Apr. 16, 2002 (JP) .................................... 2002-113918

(51) Int. Cl.[7] .................. B23K 26/08; G05B 19/423
(52) U.S. Cl. ........................... 219/121.67; 219/121.78
(58) Field of Search .................. 219/121.6, 121.67, 219/121.68, 121.69, 121.72, 121.78, 121.81, 121.82, 69.11, 69.17; 700/159–166; 364/474.01, 474.02, 474.08

(56) References Cited

U.S. PATENT DOCUMENTS

| | | | | |
|---|---|---|---|---|
| 4,469,930 A | * | 9/1984 | Takahashi | 219/121.72 |
| 4,742,206 A | * | 5/1988 | Dietterich et al. | 219/121.67 |
| 4,908,493 A | * | 3/1990 | Susemihl | 219/121.67 |
| 5,149,937 A | * | 9/1992 | Babel et al. | 219/121.68 |
| 5,225,650 A | * | 7/1993 | Babel et al. | 219/121.69 |
| 5,239,159 A | * | 8/1993 | Masuda | 219/121.78 |
| 5,239,160 A | * | 8/1993 | Sakura et al. | 219/121.82 |
| 5,340,962 A | * | 8/1994 | Schmidt et al. | 219/121.78 |
| 5,525,776 A | * | 6/1996 | Okamoto | 219/121.68 |
| 5,793,015 A | * | 8/1998 | Walczyk | 219/121.67 |
| 6,522,941 B1 | * | 2/2003 | Tashiro et al. | 700/180 |

FOREIGN PATENT DOCUMENTS

JP  2001-001174  1/2001

* cited by examiner

Primary Examiner—Samuel M. Heinrich
(74) Attorney, Agent, or Firm—Duane Morris LLP

(57) ABSTRACT

At the time of execution of concurrent six-axes cylindrical interpolation instruction wherein a start point, an intermediate point, an end point and feed speed are instructed in a machining program PRO, a machining data computing portion 59 computes angular velocity of first, second, and third rotational axis directions and moving speed of first, second and third axial directions so as to correspond the feed speed of a torch with respect to a workpiece with the feed speed instructed in the machining program PRO, and the machining control portion 55 simultaneously controls the first, second and third axes and the first, second and third rotational axes on the basis of the angular velocity and the moving speed which are computed so as to rotate a chuck holding the workpiece and to move the torch, so that machining on the workpiece is executed.

6 Claims, 10 Drawing Sheets

Fig.10
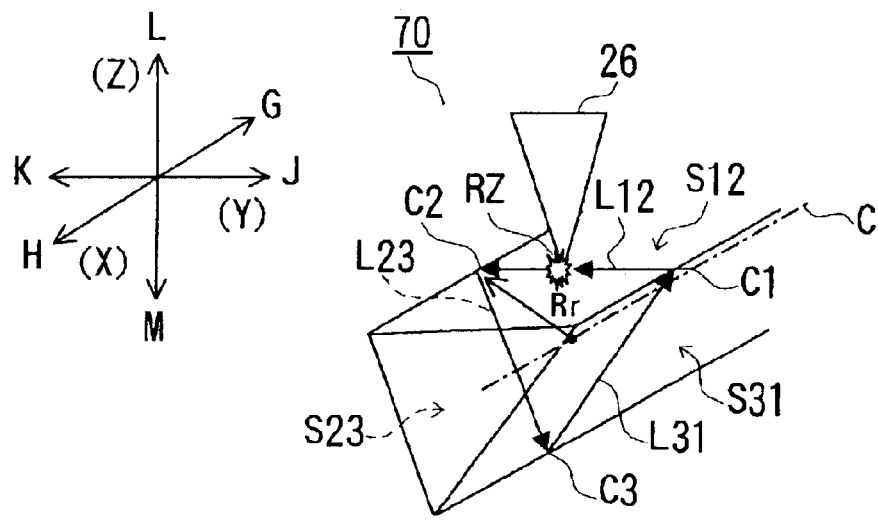
(a)
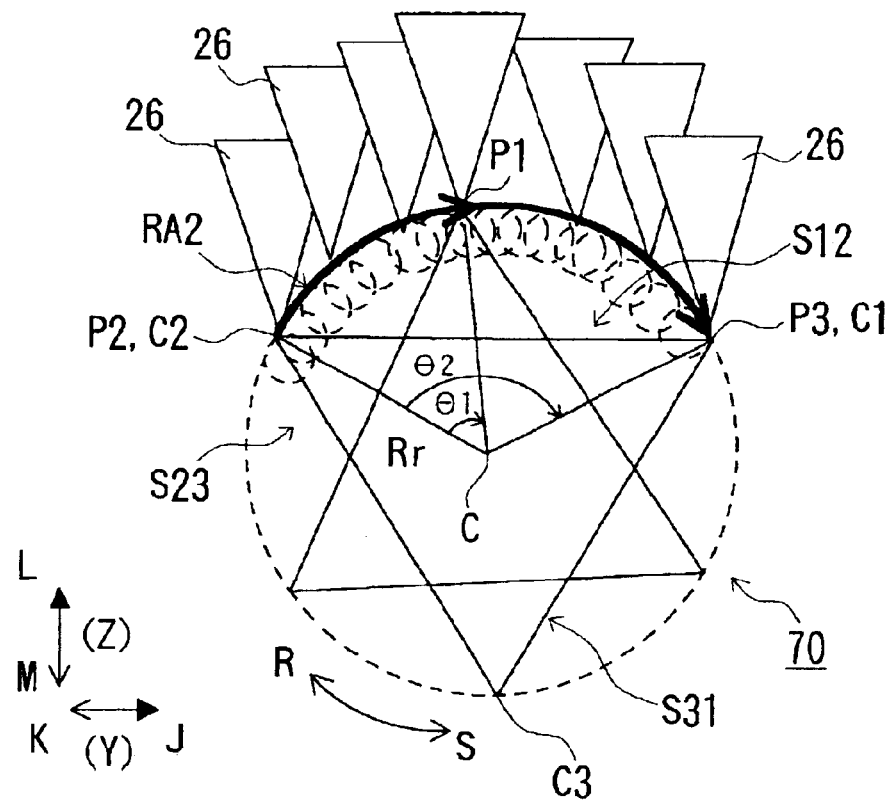
(b)

THREE DIMENSIONAL LINEAR MACHINING APPARATUS

BACKGROUND OF THE INVENTION

The present invention relates to a three dimensional linear machining apparatus for three dimensional machining on a long-shaped member, such as a pipe, such as a laser beam machine, a plasma cutting machine, and a gas cutting machine.

Such kind of conventional three dimensional linear machine which has been proposed is the three dimensional laser beam machine wherein the direction of a torch from which laser beam is radiated is three-dimensionally adjustable with respect to a workpiece. Such a three-dimensional laser beam machine can three-dimensionally machine a workpiece by a linear/arc interpolation instruction for moving and driving a torch on a straight line/an arc or a cylindrical interpolation instruction for rotating a workpiece. In case where the sectional shape of a workpiece to be machined is an irregular shape having a corner, but the feed speed of the torch with respect to the workpiece can not be uniformly maintained in a machining path passing through the corner since the linear/arc interpolation instruction and the cylindrical interpolation instruction can not be simultaneously controlled, so that irregularity may be formed on a surface cut by machining. That is, it is difficult to maintain a cut surface having no irregularity and to successively machine a member having an irregular shape along the above-mentioned machining path. For these reasons, the member having the irregular shape is necessary to be machined every each machining face of the workiece, so that much labor and/or long time is required for such operation, and it is difficult to actualize speedy machining.

Under such a situation, such a method is known that the machining path passing through a corner is successively machined concerning a workpiece, such as an irregularly shaped member, by using the interpolation instruction of micro line segment by the machining program produced by a CAD/CAM unit.

But, long time is necessary for complex computation in such a machining, and besides, specific skill is also necessary. In addition, a CAD/CAM unit is separately necessary, and it is necessary to prepare enormous memory capacity for a machining program produced. Besides, the interpolation instruction of micro line segment is used, so that the machining speed is slow and it is difficult to actualize speedy machining.

Therefore, the development of the three dimensional linear machining apparatus for easily executing a machining without a skill wherein the face cut by machining can be maintained in a good condition, having no irregularity, speedy machining can be actualized by a successive machining on a workpiece, such as an irregularly shaped member, and a CAD/CAM unit and the memory capacity for a machining program are not necessary has been desired.

SUMMARY OF THE INVENTION

That is, the present invention is three dimensional linear machining apparatus having means for rotating, holding and driving, by which a workpiece can be held with a first axis as its center and said workpiece can be held so as to be freely angularly rotated and driven in a first rotational axis direction with said first axis as its center, and a machining portion provided so as to be freely moved and driven in said first axial direction and second and third axial directions orthogonal thereto and so as to be freely angularly rotated and driven in second and third rotational axis directions with said second and third axes as their centers with respect to said workpiece held by said means for rotating, holding and driving, comprising:

means for computing axial speed, for computing angular velocity in said first, second and third rotational axis directions and moving speed in said first, second and third axial directions so as to correspond feed speed of said machining portion with respect to said workpiece with feed speed instructed in a machining program at the time of execution of concurrent six axes cylindrical interpolation instruction in which a start point, an intermediate point, an end point and feed speed are instructed in said machining program; and means for executing machining, for executing machining on said workpiece by simultaneously controlling said first, second and third axes and said first, second and third rotational axes on the basis of said angular velocity in said first, second and third rotational directions and said moving speed in said first, second and third axial directions, which are computed by said means for computing axial speed.

According to this invention, the means for executing machining executes machining on the workpiece by simultaneously controlling the first, second and third axes and the first, second and third rotational axes on the basis of the angular velocity in the first, second and third rotational directions and the moving speed in the first, second and third axial directions which are computed by the means for computing axial speed, so that the workpiece of which sectional shape is irregular shape having a corner can be also successively machined along a machining path passing through the corner, it is not necessary to machine the workpiece every each machining surface as a conventional case, and speedy machining can be actualized. Furthermore, concurrent six-axes cylindrical interpolation instruction is executed so as to correspond the feed speed of the machining portion with respect to the workpiece with the feed speed instructed in the machining program, so that a cut face in a good condition having no surface irregularity can be made with machining while speedy machining is actualized. Besides, the concurrent six-axes cylindrical interpolation instruction is executed by instructing the start point, the intermediate point, the end point and the feed speed in the machining program, so that a CAD/CAM unit and memory capacity for the machining program are not specifically necessary, and the machining can be easily performed without specific skill.

Besides, the present invention is the three dimensional linear machining apparatus, wherein means for judging ceiling speed, for judging as to whether or not said angular velocity in said first, second and third rotational axis directions and said moving speed in said first, second and third axial directions computed by said means for computing axial speed, exceed a predetermined ceiling value set for each axis is provided, and means for amending speed, for amending said speed judged exceeding said ceiling value when said means for judging ceiling speed judges that said angular velocity in said first, second and third rotational axis directions and said moving speed in said first, second and third axial directions exceed said predetermined ceiling value set for each axis, is provided, wherein said means for executing machining executes machining on said workpiece at speed amended by said means for amending speed.

According to this invention, the means for executing machining executes machining on the workpiece at the speed amended by the means for amending speed on the basis of the judgment of the means for judging ceiling speed, so that successive machining can be correctly executed along the machining path passing through the corner even if the angular velocity of each rotational direction and the moving speed in each axial direction exceed a predetermined ceiling value.

Besides, the present invention is the three dimensional linear machining apparatus, wherein said three dimensional linear machining apparatus is a laser beam machine, and means for changing condition for outputting laser beam, for changing condition for outputting laser beam radiated from said machining portion of said laser beam machine when said speed of said each axis is amended by said means for amending speed is provided.

According to this invention, the means for changing condition for outputting laser beam changes the condition for outputting laser beam when the speed of each axis is amended by the means for amending speed, so that the condition for outputting laser beam according to the amended speed of each axis can be set, and the machining for making a cut face in a good condition having no irregularity can be certainly executed.

BRIEF DESCRIPTION OF THE DRAWINGS

FIG. 10 is an instance of machining control for a long-shaped member having a section in the shape of a triangle according to the present invention, wherein (a) is a perspective view for typically showing the long-shaped member having a section in the shape of a triangle for explanation of machining control, and (b) is a view seen from an A direction of FIG. 2 for explanation of machining control of (a).

DESCRIPTION OF THE PREFERRED EMBODIMENTS

Figure 1:
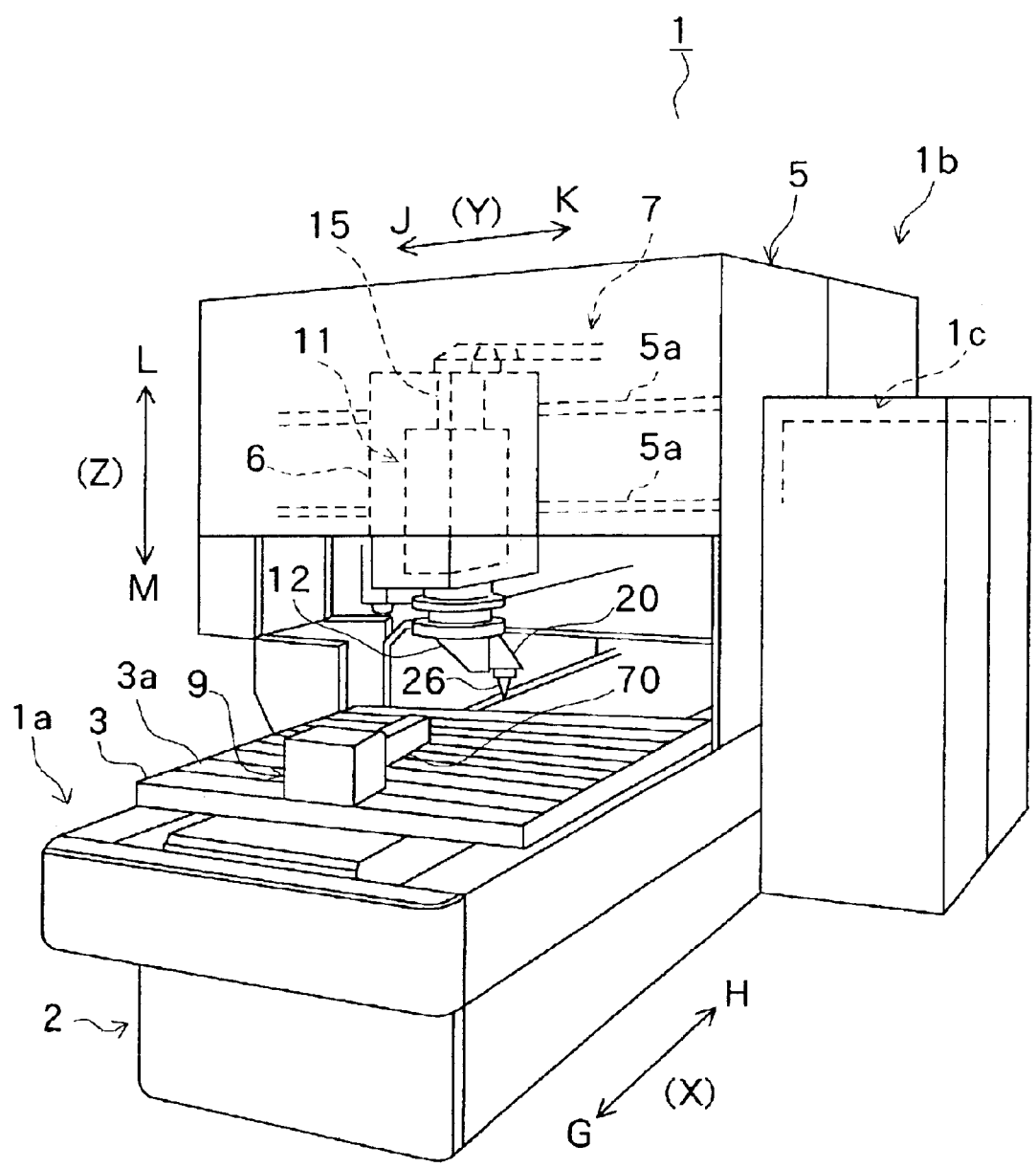
FIG. 1 is a perspective view for showing an instance of the whole laser beam machine to which the present invention is applied.
Figure 2:
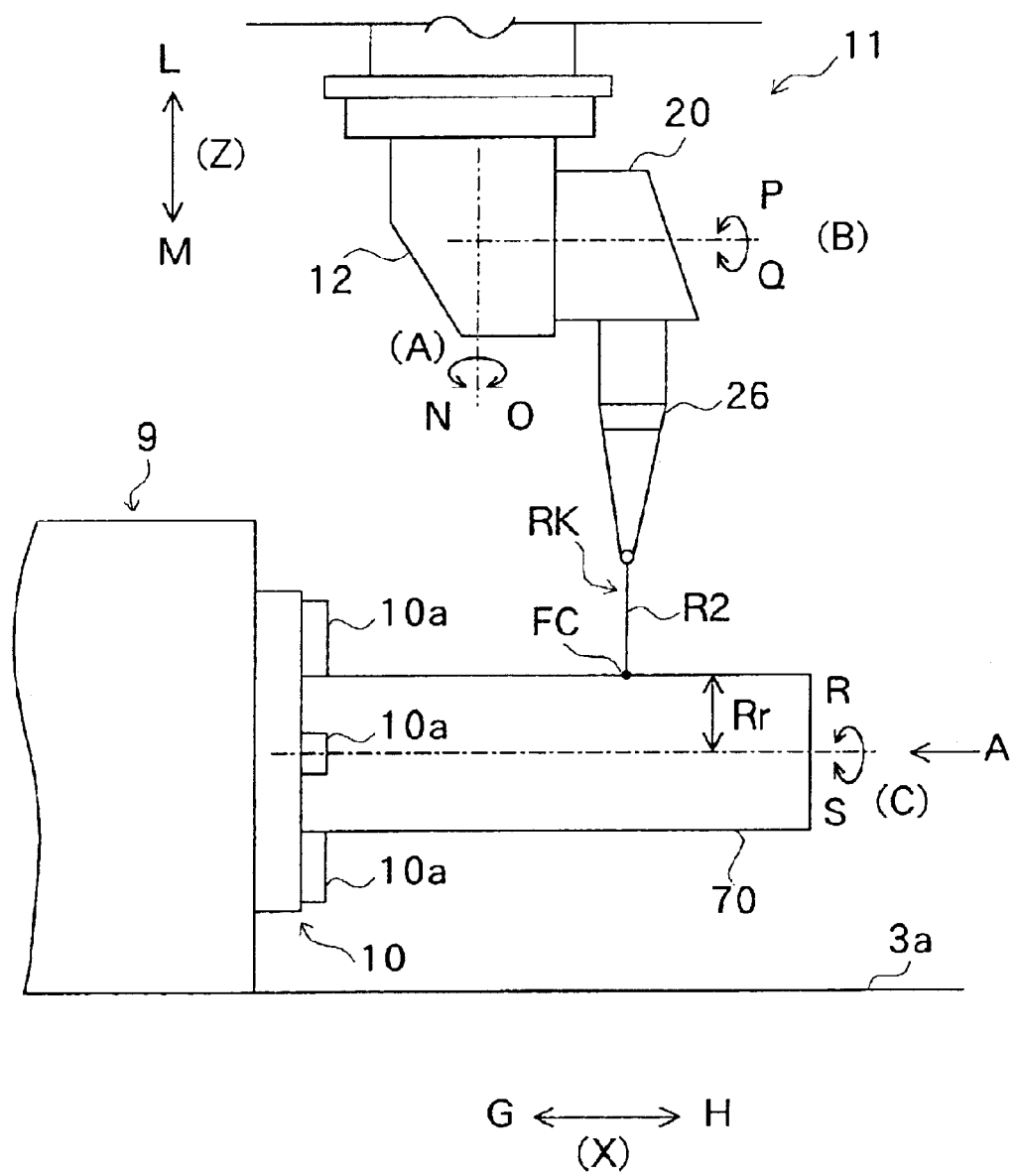
FIG. 2 is a side view for showing a chuck of the laser beam machine of FIG. 1 and its neighborhood.
Figure 3:
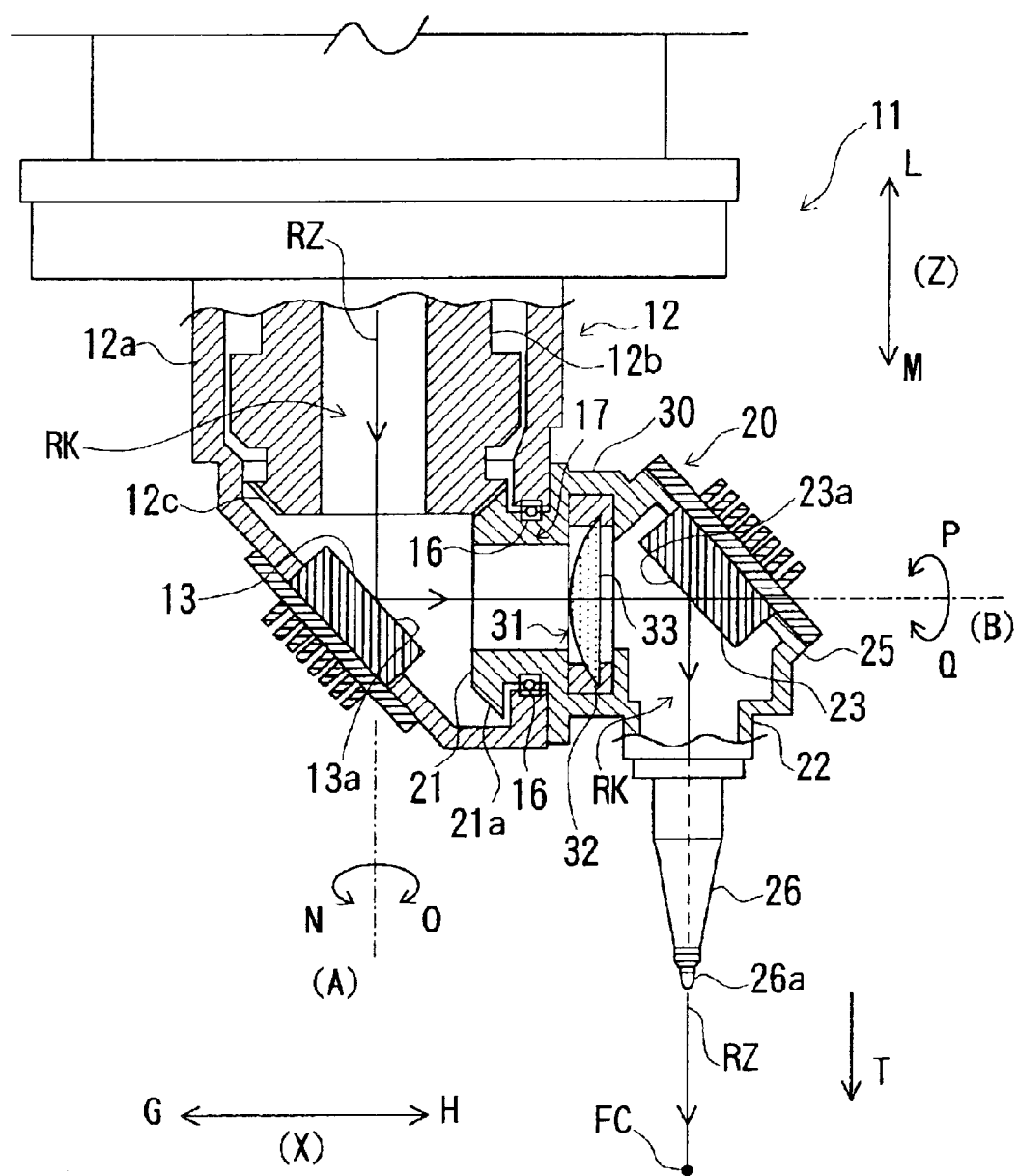
FIG. 3 is an enlarged sectional view for showing a machining head body of the laser beam machine of FIG. 1.
Figure 4:
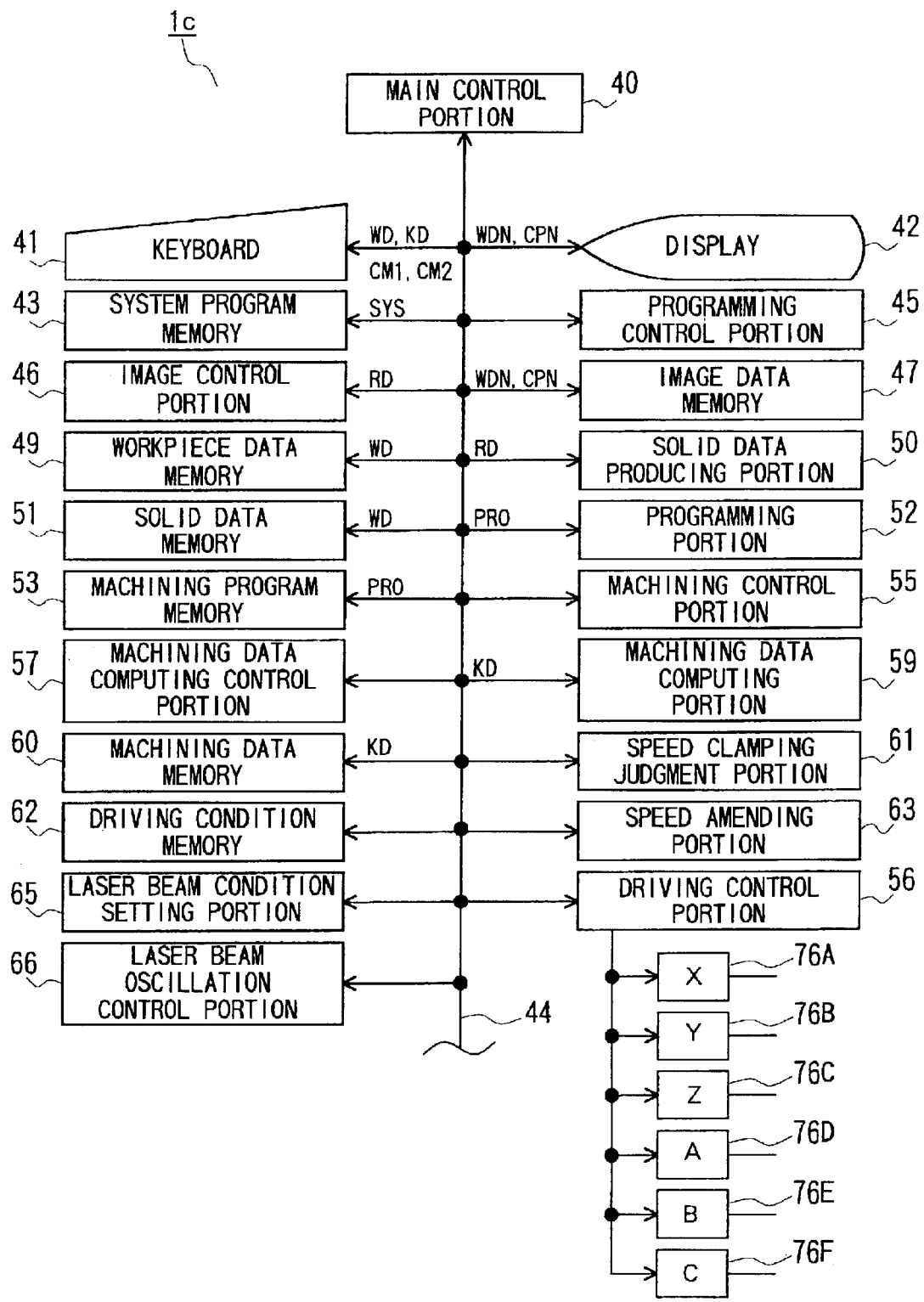
FIG. 4 is a block diagram for showing a control unit of the laser beam machine of FIG. 1.
Figure 5:
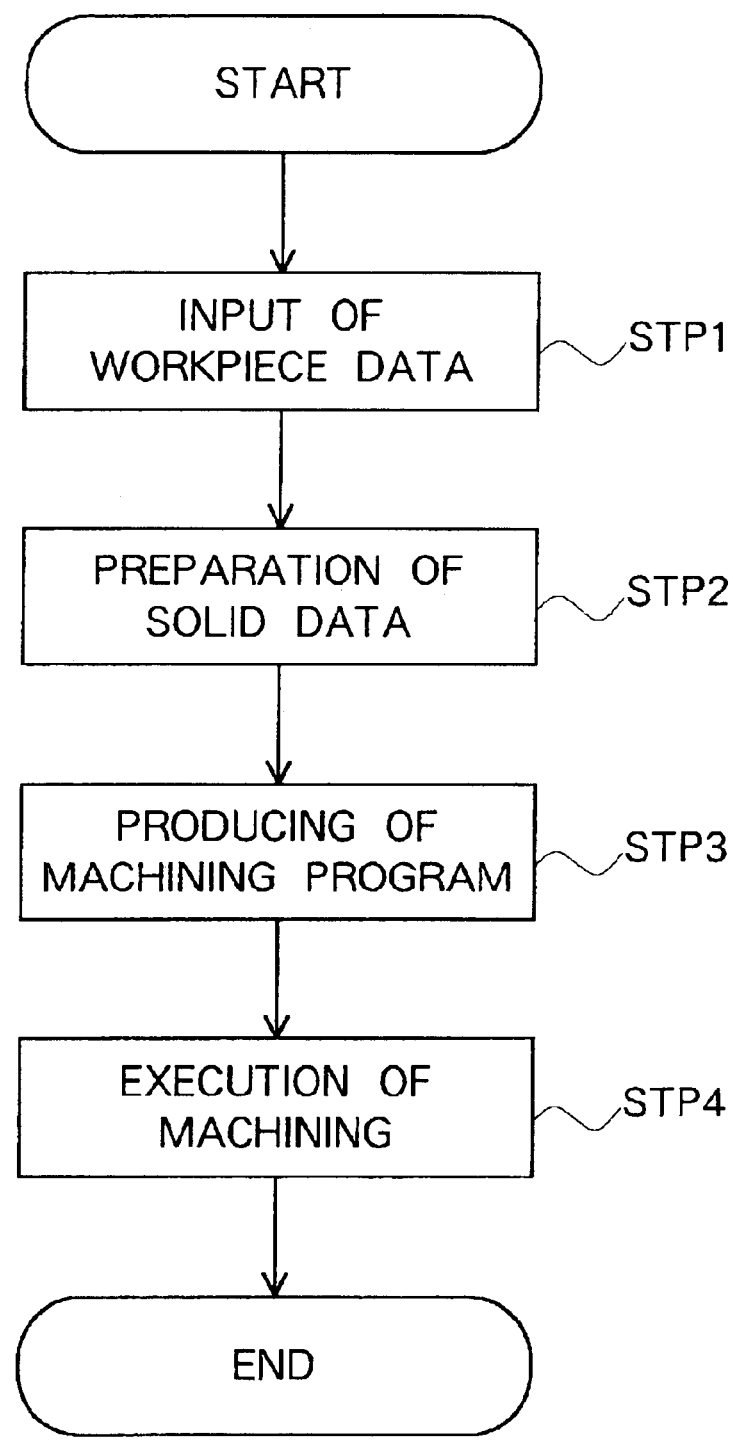
FIG. 5 is a flow chart for showing flow of processing at the time of machining with the laser beam machine.
Figure 6:
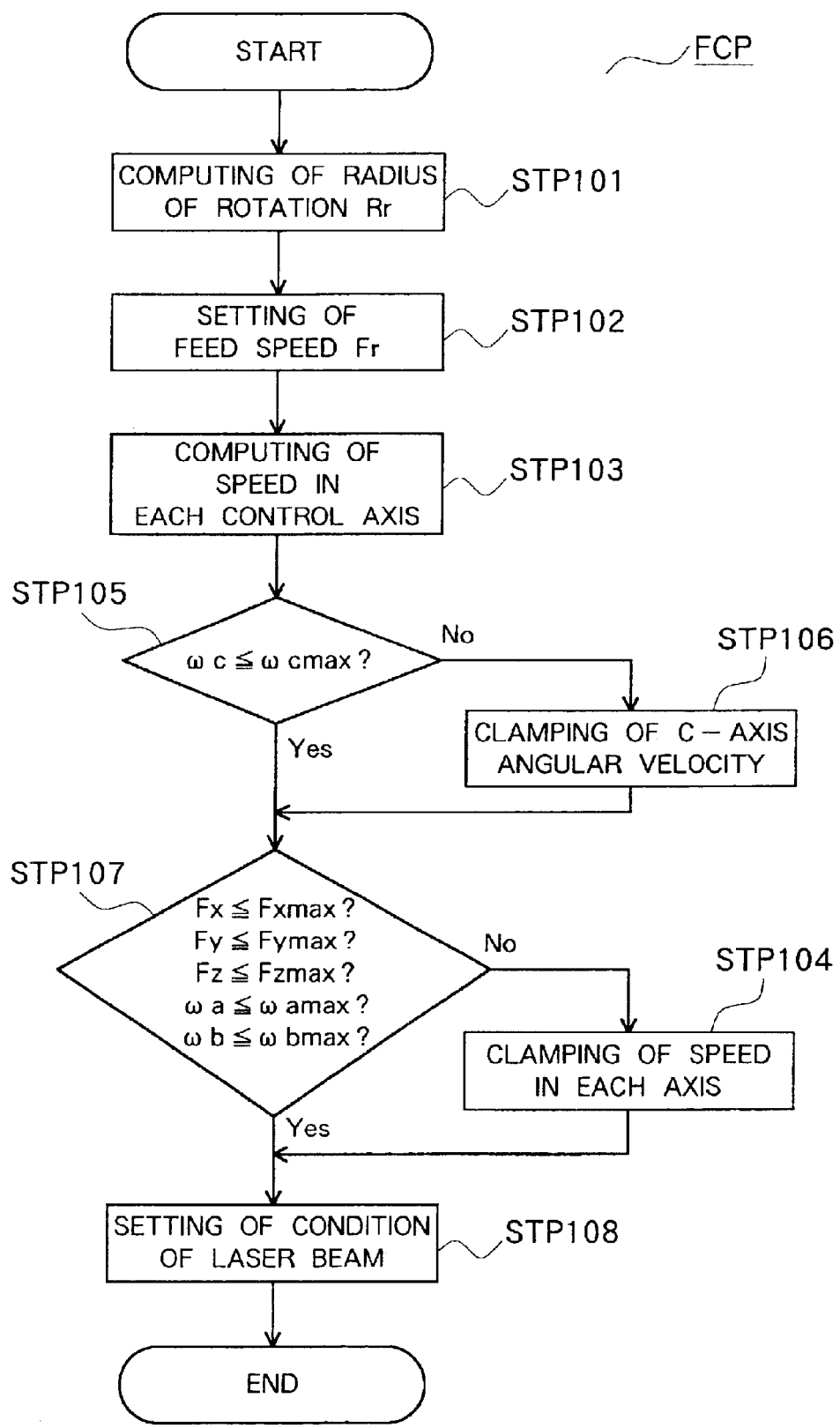
FIG. 6 is a flow chart for showing a program for controlling feed speed.
Figure 7:
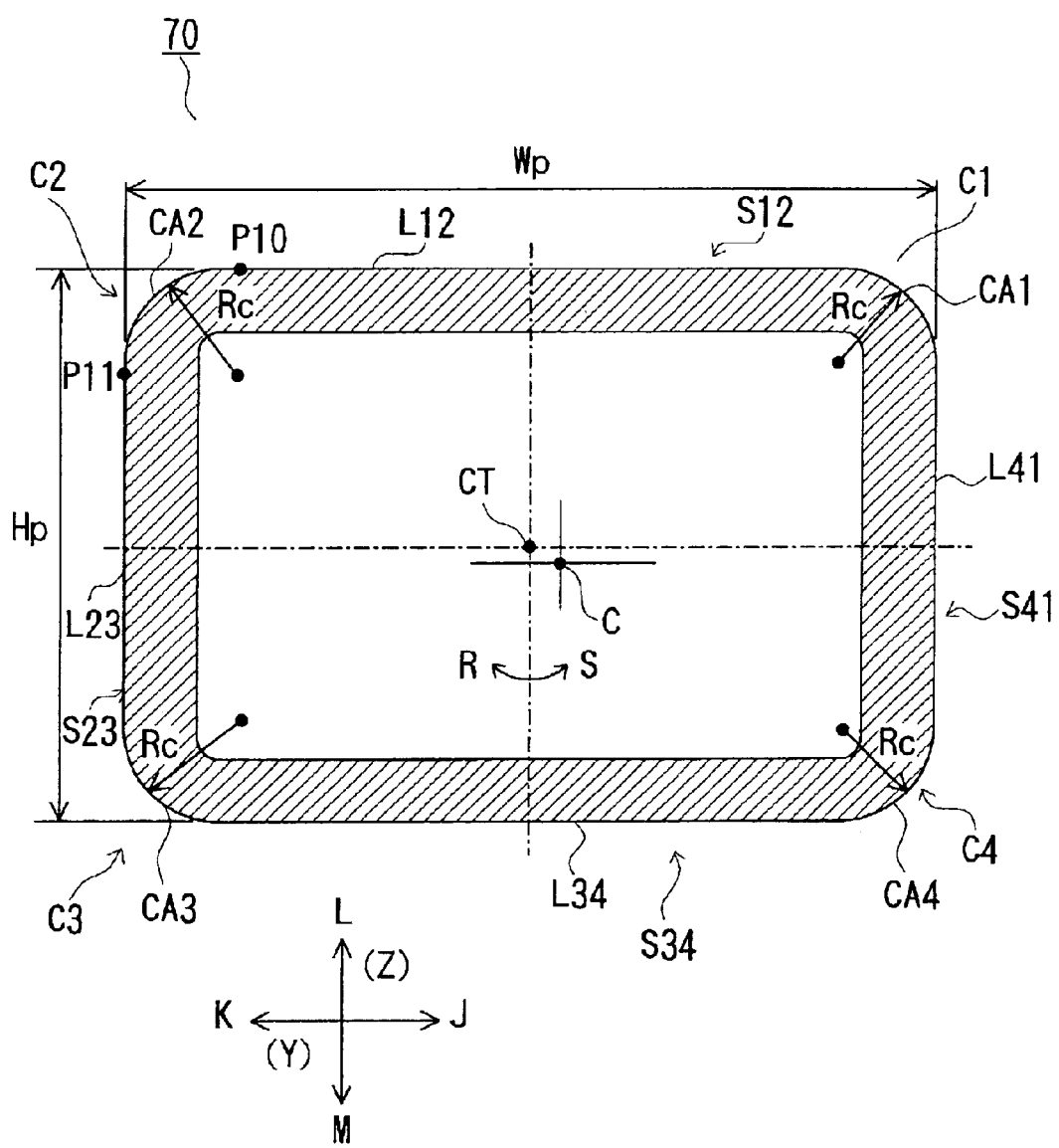
FIG. 7 is a sectional view of a long-shaped member having a section of a rectangle, on which cutting machining is performed according to the present invention.
Figure 8:
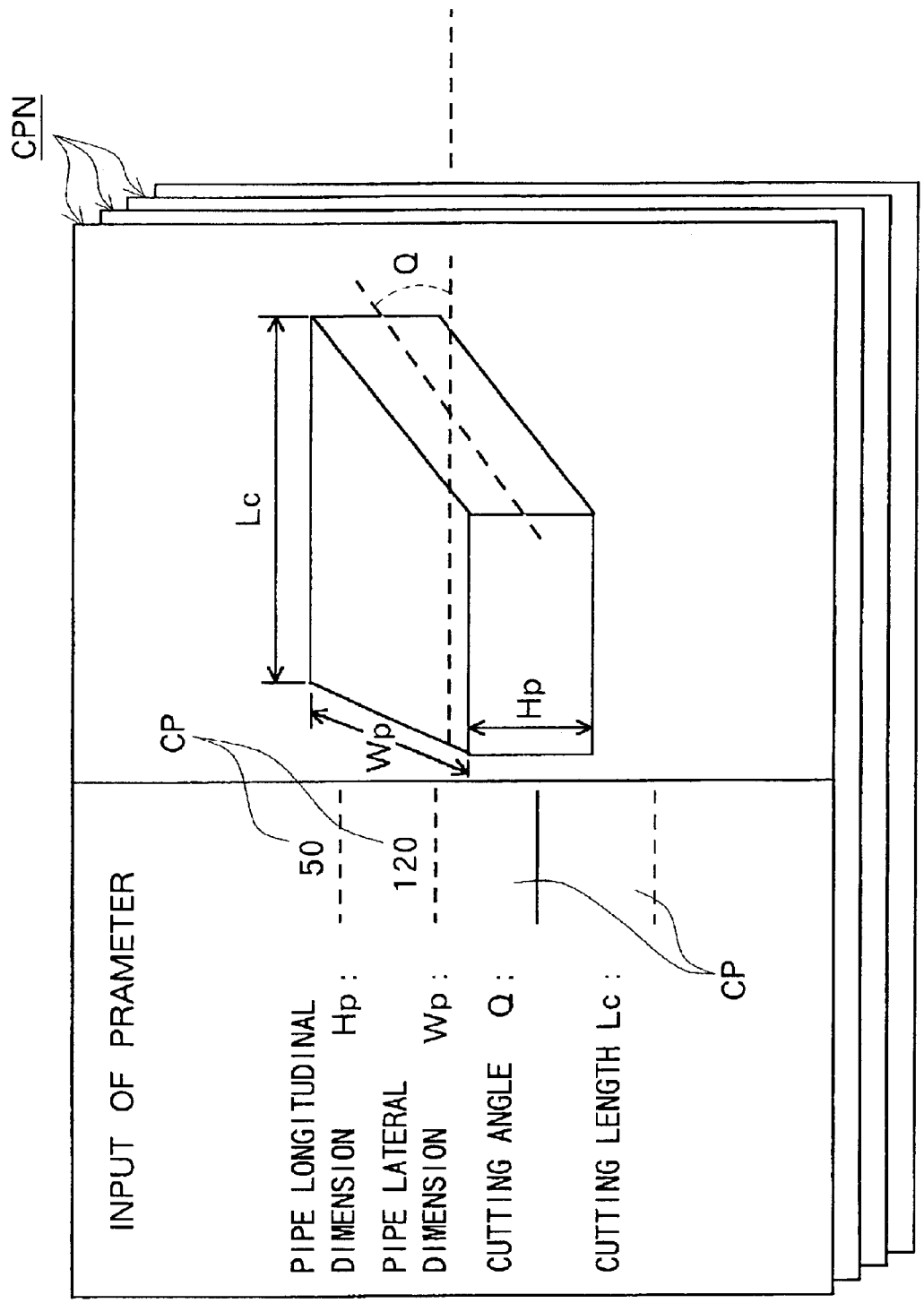
FIG. 8 is a view for showing an imaged scope for inputting code parameter.
Figure 9:
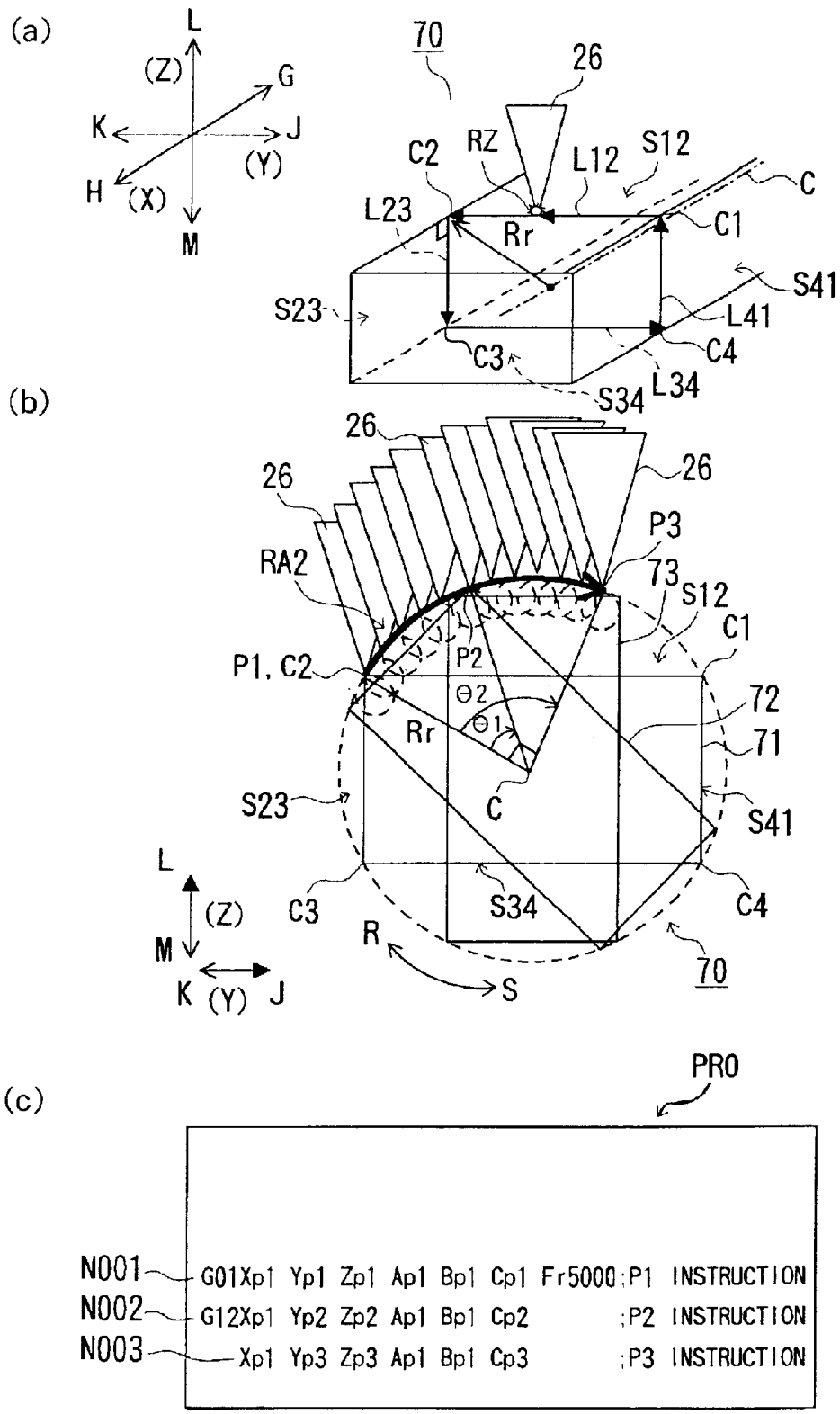
FIG. 9 is an instance of machining control for a long-shaped member having a section in the shape of a rectangle according to the present invention, wherein (a) is a perspective view for typically showing the long-shaped member having a section in the shape of a rectangle for explanation of machining control, (b) is a view seen from an A direction of FIG. 2 for explanation of machining control of (a) and (c) is a view for showing a part of a machining program for executing machining of (a)

FIG. 1 is a perspective view for showing an instance of the whole laser beam machine to which the present invention is applied, FIG. 2 is a side view for showing a chuck of the laser beam machine of FIG. 1 and its neighborhood, FIG. 3 is an enlarged sectional view for showing a machining head body of the laser beam machine of FIG. 1, FIG. 4 is a block diagram for showing a control unit of the laser beam machine of FIG. 1, FIG. 5 is a flow chart for showing flow of processing at the time of machining with the laser beam machine, FIG. 6 is a flow chart for showing a program for controlling feed speed, FIG. 7 is a sectional view of a long-shaped member having a section of a rectangle, on which cutting machining is performed according to the present invention, FIG. 8 is a view for showing an imaged scope for inputting code parameter, FIG. 9 is an instance of machining control for a long-shaped member having a section in the shape of a rectangle according to the present invention, wherein (a) is a perspective view for typically showing the long-shaped member having a section in the shape of a rectangle for explanation of machining control, (b) is a view seen from an A direction of FIG. 2 for explanation of machining control of (a), and (c) is a view for showing a part of a machining program for executing machining of (a), and FIG. 10 is an instance of machining control for a long-shaped member having a section in the shape of a triangle according to the present invention, wherein (a) is a perspective view for typically showing the long-shaped member having a section in the shape of a triangle for explanation of machining control, and (b) is a view seen from an A direction of FIG. 2 for explanation of machining control of (a).

A laser beam machine 1 (three dimensional linear processing machine) to which the present invention is applied is a NCN unit for machining a pipe (NC cutting machine) as shown in FIG. 1, for instance. The laser beam machine 1 is comprised of a workpiece stationing unit 1a, a laser beam radiating unit 1b and a control unit 1c. The laser beam radiating unit 1b is located over the workpiece stationing unit 1a, and the control unit 1c is provided, attaching to the workpiece stationing unit 1a and a laser beam radiating unit 1b.

The workpiece stationing unit 1a has a base 2 and a table 3, as shown in FIG. 1. The base 2 fixes the laser beam machine 1 on a floor, and the table 3 is located thereon. The table 3 has a horizontal workpiece location surface 3a, and freely moves in a direction as shown by arrows G and H (X-axis direction) as shown in FIGS. 1 through 3 with respect to the base 2. And, a chuck unit 9 is fixed on the workpiece location surface 3a.

The chuck unit 9 has a chuck 10 as shown in FIG. 2, and the chuck 10 is free to be angularly rotated, to be driven and to be positioned in a direction as shown by arrows R and S with a C-axis parallel to the X-axis as its center. The chuck 10 is provided with a plurality of jaws 10a on a concentric circle which center is the C-axis at a distance of almost equal angle. That is, a plurality of jaws 10a freely hold an outer periphery of one end of a workpiece 70, comprised of a long shaped member, such as a round pipe and a square pipe, and attachably and detachably holds the workpiece 70 such that a rotating axis C (a rotating axis of the workpiece 70) is parallel to the X-axis. That is, the workpiece 70 is located, being free to be angularly rotated, to be driven, and to be positioned with the C-axis as its center together with the chuck 10.

And, the laser beam radiating unit 1b has a column 5, a saddle 6 and a machining head body 11, as shown in FIG. 1. The column 5 is fixed on the base 2, bridging over the table 3 which can move in the X-axis direction so as not to interfere with the table 3. And, the column 5 has rails for saddle 5a, 5a along a direction as shown by arrows J and K perpendicular to and horizontal to the X-axis direction (a Y-axis direction), and the saddle 6 freely moves and drives in the Y-axis direction with respect to the base 2 through the rails for saddle 5a, 5a. In the above-mentioned explanation, the base 2 moves in the X-axis direction, but the present invention is not limited to such a structure as long as the saddle 6 can be relatively moved and driven with respect to the base 2 in the X-axis direction and the Y-axis direction. The saddle 6 may freely move in the X-axis direction and the Y-axis direction and the base 2 may be fixed.

The column 5 has a laser beam oscillator (not shown) for outputting laser beam. The laser beam oscillator and the saddle 6 are connected with each other through a proper laser beam path tube 7 which freely moves and expands together with the movement of the saddle 6 in the Y direction, as shown in FIG. 1. Furthermore, the laser beam path tube 7 is connected with the machining head body 11 provided inside the saddle 6 through an optical path tube for saddle 15 formed, similar to the laser beam path tube 7.

On this occasion, any type of laser beam oscillator is available as long as the oscillator can stably radiate a predetermined output of laser beam with which the workpiece 70 comprised of metal can be cut and bored. For instance, a $CO_2$ laser beam oscillator, YAG laser beam oscillator or excimer laser beam oscillator can be applied to the present invention.

The machining head body 11 has a sleeve member 12, a top end member 20, and a torch 26, as shown in FIG. 2 or FIG. 3, and freely moves and drives with respect to the saddle 6, being perpendicular to the X-axis direction and the Y-axis direction, that is, in a direction as shown by arrows L and M as shown in FIGS. 1 through 3 (Z-axis direction). That is, the machining head body 11 is provided, being free to be moved and driven with respect to the base 2 in the Z-axis direction through the saddle 6 and the column 5.

The sleeve member 12 is comprised of an outside sleeve 12a and an inside sleeve 12b, as shown in FIG. 3, and the cylindrical inside sleeve 12b is fittingly inserted into the outside sleeve 12a. The outside sleeve 12a is free to be angularly rotated, to be driven with respect to the machining head body 11 in a direction as shown by arrows N and O with the A-axis parallel to the Z-axis direction as its center, as shown in FIG. 3.

The inside sleeve 12b is similarly provided, being free to be angularly rotated and driven in the direction as shown by the arrows N and O with respect to the outside sleeve 12a. At the outer periphery of the lower end of the inside sleeve 12b (lower side of FIG. 3 in the paper), a bevel gear 12c is formed, and the bevel gear 12c is engaged with a bevel gear 21a (described hereinafter) formed on the top end member 20 so as to output power of a drive unit (not shown) comprised of a motor to the top end member 20 side.

And, a first mirror 13 is located inside the outside sleeve 12a (the lower side of the paper in FIG. 3) in such a way that a reflecting surface 13a of the mirror 13 is inclined a predetermined angle such that a laser beam path RK is perpendicularly bent by the first mirror 13 as shown in FIG. 3 and laser beam RZ entered into the machining head body 11 can be reflected to the top end member 20 side.

The top end member 20 is comprised of a cylindrical portion 21, a torch mounting face 22, a mirror mounting portion 25 and a cartridge installation portion 30, as shown in FIG. 3. The cylindrical portion 21 is formed at the side portion of the mirror mounting portion 25 (the left side of the paper of FIG. 3) through the cartridge installation portion 30. Furthermore, the torch mounting face 22 is formed at the lower portion of the mirror mounting portion 25 (the lower side of the paper of FIG. 3).

The bevel gear 21a is formed at the end portion of the cylindrical portion 21 (the left side of the paper in FIG. 3), and the cylindrical portion 21 is connected with the outside sleeve 12a through a ball bearing 16 being free to be angularly rotated such that the bevel gear 21a is inserted into an opening 17 formed at the side portion of the outside sleeve 12a (the right side of the paper in FIG. 3). As already mentioned, the bevel gear 21a is engaged with the bevel gear 12c of the inside sleeve 12b so as to be free to be rotated perpendicular to the A-axis. That is, the top end member 20 is provided, being free to be angularly rotated and to be driven with respect to the outside sleeve 12a in the direction as shown by the arrows P and Q with the B-axis parallel to the X-axis as its center as shown in FIG. 2 or FIG. 3. And, the torch 26 is located at the torch mounting portion 22 so as to face a torch top end portion 26a toward the lower (the lower side of the paper of FIG. 3) That is, the torch 26 is also provided, being free to be angularly rotated and driven with the B-axis as its center together with the top end member 20. In the above-mentioned explanation, the respective portions of the laser beam machine 1 can be moved, rotated and driven in the X-axis, Y-axis, Z-axis, A-axis, B-axis and C-axis directions. But, the present invention is not limited to such a structure. Any structure of the laser beam machine 1 is available as long as the torch 26 can be three-dimensionally moved, rotated, and driven with respect to the workpiece 70 which can be angularly rotated, driven and positioned.

And, a second mirror 23 is located inside the mirror mounting portion 25 in such a way that a reflecting surface 23a of the mirror 23 is inclined a predetermined angle such that the laser beam path RK is perpendicularly bent as shown in FIG. 3 and the laser beam RZ entered from the outside sleeve 12a side can be radiated from the torch top end potion 26a.

The cartridge installation portion 30 is provided with a lens cartridge 31 comprised of a condensing lens 33 and a lens frame 32 for fixing the condensing lens 33 so as to be freely attached thereto and freely detached therefrom. The lens cartridge 31 is provided on the laser beam path RK as shown in FIG. 3 formed inside the cartridge installation portion 30 such that the laser beam RZ can be collected at a predetermined position with the condensing lens 33.

And, the control unit 1c of the laser beam machine 1 has a main control portion 40, as shown in FIG. 4. A keyboard 41, a display 42, a system program memory 43, a programming control portion 45, an image control portion 46, an image data memory 47, a workpiece data memory 49, a solid data producing portion 50, a solid data memory 51, a programming portion 52, a machining program memory 53, a machining control portion 55, a driving control portion 56, a machining data computing control portion 57, a machining data computing portion 59, a machining data memory 60, a speed clamping judgment portion 61, a driving condition memory 62, a speed amending portion 63, a laser beam condition setting portion 65, and a laser beam oscillation control portion 66 are connected with the main control portion 40 via a bus line 44. Drive motors 76A, 76B, 76C, 76D, 76E and 76F for respectively driving X-axis, Y-axis , Z-axis , A-axis, B-axis , and C-axis which are control axes are connected with the driving control portion 56.

The laser beam machine 1 has the above-mentioned structure. The control of machining with the laser beam machine 1 is comprised of programming of a machining program PRO explained hereinafter and a machining executing the machining program PRO programmed. The machining program PRO is produced on the basis of input of workpiece data WD (step STP1) and producing of solid data RD (step STP2) described hereinafter, as shown in FIG. 5 (step STP3). The drive motors 76A, 76B, 76C, 76D, 76E and 76F are properly driven on the basis of the machining program PRO produced in the above-mentioned way so as to respectively move and rotate the table 3, the column 5, the saddle 6, the outside sleeve 12a, the inside sleeve 12b, and the chuck 10 (referred to as only "movable portions 3, 5, 6, 12a, 12b, 10" hereinafter) in the X-axis, Y-axis, Z-axis, A-axis, B-axis and C-axis directions such that the workpiece 70 is machined into a desired three-dimensional shape (step STP4) by radiating laser beam on the workpiece 70 comprised of irregular-shaped member while changing the relative position of the torch 26 with respect to the workpiece 70. The control of cutting machining on a square pipe (long-shaped member) as shown in FIG. 7 which has a section in the shape of a rectangle, enclosed by faces S12, S23, S34 and S41 and having corners C1, C2, C3 and C4 where radius of corner is Rc, which is an instance of an irregular-shaped member will now be explained hereinafter.

An operator (a worker) firstly locates the workpiece 70 on the laser beam machine 1 so as to position the workpiece 70 prior to the above-mentioned machining control. Concretely speaking, when one end of the workpiece 70 is held by a plurality of jaws 10a as shown in FIG. 2 so as to locate the workpiece 70, the rotational center of the workpiece 70 is corresponded with the C-axis as much as possible and a face on which cutting machining is started is horizontally positioned. For instance, the workpiece 70 is positioned so as not to shift a rotational center CT (center of gravity concerning a section of a rectangle) of the workpiece 70 with respect to the C-axis and so as to horizontally position the face on which cutting machining is started (such as the face S12) (that is, so as to make parallel to the Y-axis) as shown in FIG. 7. On this occasion, the above-mentioned positioning is not always accomplished by an operator, but the processing for automatically setting correction of the above-mentioned shift or horizontal positioning of a face may be set in the machining program PRO in advance. For instance, the processing for detecting the quantity of shift by a predetermined sensor and for correcting the movement of the respective movable portions 3, 5, 6, 12a, 12b and 10 on the basis of the result detected may be set in the machining program PRO. Furthermore, the horizontal positioning of a face for detecting a distance between X-Y plane and a plurality of points on the face S12 (two or more points wherein the line connecting two points with each other is not parallel to the C-axis) by a predetermined distance sensor and for rotating the chuck 10 a predetermined angle on the basis of the result detected may be automatically set in the machining program.

Subsequently, an operator inputs a start instruction through a start switch (not shown) owned by the control unit 1c. Receiving this instruction, the main control portion 40 reads a system program SYS from the system program memory 43. Thereafter, the main control portion 40 processes steps STP1 through STP4 as shown in FIG. 5 according to the read system program SYS.

Furthermore, an operator inputs an instruction CM1 for producing the machining program PRO through the keyboard 41. The instruction CM1 is transferred to the main control portion 40. Receiving this, the main control portion 40 instructs the programming control portion 45 to produce the machining program PRO. And, the programming control portion 45 inputs the workpiece data WD and produces the solid data RD prior to programming of the machining program PRO.

In step STP1, the programming control portion 45 firstly instructs the image control portion 46 to display a workpiece data input scope WDN (not shown) The workpiece data WD are a material of the workpiece 70 (such as soft steel and stainless steel), a shape of the workpiece (a sectional shape, such as a rectangle, a triangle, a L-shape, a semicircle, and a dimension of the workpiece (such as radius of corner Rc, board thickness Dp, pipe longitudinal dimension Hp, and pipe lateral dimension Wp). The workpiece data input scope WDN is comprised of a scope which invites an operator to input the workpiece data WD. Receiving the above-mentioned instruction, the image control portion 46 accesses the workpiece data input scope WDN stored in the image data memory 47 so as to display on the display 42. After the workpiece data input scope WDN is displayed, an operator inputs the above-mentioned workpiece data WD through the keyboard 41 according to the workpiece data input scope WDN, and the workpiece data WD input is stored in the workpiece data memory 49 through the programming control portion 45. If the radius of corner Rc is relatively small, such as almost zero (in case of sharp corner), the programming control portion 45 stores a lowest limit value of the radius of corner Rc which is set in advance in the workpiece data memory 49 as the radius of corner Rc.

After finishing input of the workpiece data WD in step STP2, the programming control portion 45 instructs the image control portion 46 to display a code parameter input scope CPN. The code parameter CP is each dimension necessary for an operator for desired machining shape. And, the code parameter input scope CPN is comprised of a scope which invites an operator to input the code parameter CP as shown in FIG. 8, for instance, and "pipe longitudinal dimension Hp", "pipe lateral dimension Wp", "cutting angle Q" and "cutting length Lc" are displayed thereon as name of necessary each dimension. Receiving the above-mentioned instruction, the image control portion 46 accesses the code parameter input scope CPN stored in the image data memory 47 so as to display on the display 42. When the code parameter input scope CPN is displayed, an operator inputs a numeric value corresponding to the name of the necessary each dimension according to the code parameter input scope CPN through the keyboard 41, and the input code parameter CP is stored in the solid data memory 51 through the programming control portion 45. On this occasion, the data of the code parameter input scope CPN which overlaps the workpiece data WD already stored in the workpiece data memory 49, for instance, "pipe longitudinal dimension Hp" and "pipe lateral dimension Wp" may be displayed on the corresponding items in advance as shown in FIG. 8 in such a manner that "pipe longitudinal dimension Hp" and "pipe lateral dimension Wp" are read out of the workpiece data memory 49 by the programming control portion 45 so as to transfer to the image control, portion 46, and the image control portion 46 displays the transferred data.

After finishing input of the code parameter CP, the programming control portion 45 instructs the solid data producing portion 50 to produce the solid data RD. The solid data RD is the data obtained in such a way that a desired machining shape which an operator requires is embodied on the basis of the workpiece data WD and the code parameter CP (that is, the data shown with a coordinate in a three-dimensional space). Receiving the above-mentioned instruction, the solid data producing portion 50 reads the workpiece data WD out of the workpiece data mermory 49 and the code parameter CP out of the solid data memory 51 so as to produce the solid data RD. The solid data RD produced is stored in the solid data memory 51, and the solid data RD is transferred to the image control portion 46. Receiving this, the image control portion 46 displays the machining shape cut at right angles to the longitudinal direction (the C-axis direction) of the workpiece 70 (the machining shape comprised of cut face, enclosed by straight lines L12, L23, L34, L41 on the display 42 as shown in FIG. 9(*a*), for instance. An operator confirms being desired machining shape, watching the solid data RD displayed, and the producing of the solid data RD finishes If an operator judges that the solid data RD displayed is not a desired machining shape, the programming control portion 45 gets the image control portion 46 to display the workpiece data input scope WDN or the code parameter input scope CPN on the display 42 by a predetermined input by an operator, and an operator inputs the workpiece data WD or the code parameter CP again so as to change into the desired machining shape. The above-mentioned producing of the solid data RD is accomplished by input of the workpiece data WD and the code parameter CP. But, the present invention is not limited to such producing. Any type of producing is available as long as the solid data can be produced. For instance, the data of the machining shape produced with CAD/CAM unit may be input in the control unit 1*c*, or predetermined dimension, such as longitudinal or lateral dimension Hp, Wp or the moving path on the workpiece 70 (machining path) by the torch top end portion 26*a* may be input in the control unit 1*c* by teaching.

After finishing the producing of the solid data RD in step STP2, the program enters into step STP3, and the programming control portion 45 instructs the programming portion 52 to produce the machining program PRO on the basis of the data input by an operator (the workpiece data WD and the solid data RD). Then, the machining program PRO, as shown in FIG. 9(*c*) for instance, is produced.

Block N001 of this machining program PRO instructs to machine with linear interpolation instruction (G01) to the coordinate position Xp1, Yp1, Zp1, Ap1, Bp1, Cp1 in each control axis of a position P1 (referred to as only "each control coordinate position" hereinafter), and feed speed Fr at this time is 5,000 mm/min. Next blocks N002 and 003 instruct concurrent six-axes cylindrical interpolation instruction (G12) for cutting a corner C2 of the workpiece 70 in such a way that the workpiece 70 is rotated in the arrow R direction rotational angle (rotational angle in the C-axis) θ2 as shown in FIG. 9(*b*), and the torch top end portion 26*a* is moved in the arrow R direction with radius of rotation Rr, synchronizing with the moving action of the workpiece 70.

In the machining program PRO, the linear interpolation instruction (G01) for machining face S23, and concurrent six-axes cylindrical interpolation instruction (G12), similar to the above-mentioned, for cutting a corner C3 are further produced by the programming portion 52, and subsequently, the linear interpolation instruction (G01) for machining face S34 and concurrent six-axes cylindrical interpolation instruction (G12), similar to the above-mentioned, for cutting a corner C4 are all produced. But, concurrent six-axes cylindrical interpolation concerning the corner portion which is important in the present invention will now be detailedly explained, so explanation of the other blocks in the machining program PRO is omitted. But, it is off course that the next explanation concerning concurrent six-axes cylindrical interpolation can be similarly applied to the other corners C3, C4, and C1.

In the concurrent six-axes cylindrical interpolation instruction of the machining program PRO, each control coordinate position Xp1, Yp2, Zp2, Ap1, Bp1, Cp2 of an intermediate passage position P2 at the time of performing cylindrical interpolation in block N002, and each control coordinate position Xp1, Yp3, Zp3, Ap1, Bp1, Cp3 of an end position P3 at the time of performing concurrent six-axes cylindrical interpolation in block N003 are instructed. Then, the machining to be performed in such a manner that the C-axis, that is, the workpiece 70 is rotated from a C-axis coordinate position Cp1, where linear interpolation instruction finishes, to a C-axis coordinate position Cp2 in the arrow R direction, and at the same time, the torch 26 is moved to Yp2, Zp2 in the Y-axis direction and in the Z-axis direction is instructed in block N002. After passing through the C-axis coordinate position Cp2, the machining to be performed in such a manner that the C-axis, that is, the workpiece 70 is rotated from the position Cp2 to a C-axis coordinate position Cp3 in the arrow R direction, and at the same time, the torch 26 is moved to Yp3, Zp3 in the Y-axis direction and in the Z-axis direction is instructed in block N003.

After the machining program PRO including the above-mentioned concurrent six-axes cylindrical interpolation instruction is produced by the programming control portion 45 in step STP3, the machining program PRO is stored in the machining program memory 53.

After the producing of the machining program PRO, the program enters into step STP4 of FIG. 5. An operator operates the keyboard 41 so as to input an instruction CM2 for instructing the main control portion 40 to start machining on the basis of the machining program PRO. The machining control portion 55 controls driving of the drive motors 76A, 76B, 76C, 76D, 76E, 76F of the respective control axes through the driving control portion 56 on the basis of the machining program PRO so as to machine the workpiece 70, as instructed by the machining program PRO.

When the above-mentioned concurrent six-axes cylindrical interpolation instruction (G12) is instructed in the machining program PRO, the program enters into step STP4, and the main control portion 40 instructs the machining data computing control portion 57 to compute machining data KD necessary at the time of executing the concurrent six-axes cylindrical interpolation instruction. Receiving this, the machining data computing control portion 57 instructs the machining data computing portion 59 to compute the machining data KD. The machining data KD are data necessary for controlling driving of the respective movable portions 3, 5, 6, 12*a*, 12*b* and 10 at the time of executing the concurrent six-axes cylindrical interpolation instruction. The machining data computing portion 59 computes the angular velocity at which the chuck 10 rotates with the C-axis as its center (angular velocity in the C-axis ωc) and the speed at which the torch 26 moves and rotates concerning the respective control axes, such as the X-axis, the Y-axis, the Z-axis, the A-axis and the B-axis at the time of executing the concurrent six-axes cylindrical interpolation instruction of blocks N002 and N003 in the machining program PRO as shown in FIG. 9(*c*), for instance. Furthermore, the processing on the control unit 1*c* side at the time of executing the concurrent six-axes cylindrical interpolation instruction will now be concretely explained, referring to FIG. 7 and FIG. 9.

For instance, the workpiece 70 is horizontally positioned facing the face S12 in the arrow L direction on the Z-axis as shown in FIG. 9(*a*), (*b*) (in an initial state 71 as shown in FIG. 9(*b*)), and cutting machining on the workpiece 70 is supposed to be started from a corner C1 portion. Besides, the feed speed Fr is input and instructed as the feed speed of the torch 26 with respect to the workpiece 70 (relative speed) by an operator in the machining program PRO, as shown in block N001 of FIG. 9(c).

Firstly, the linear interpolation instruction (G01) is executed between the corners C1 and C2. That is, the torch 26 moves on the straight line L12 connecting the corners C1 and C2 with each other as shown in FIG. 9(a), (b) from the corner C1 in the K direction on the Y-axis at the feed speed Fr, and the workpiece 70 is cut along the straight line L12 by the laser beam RZ radiated from the torch 26.

When the torch 26 reaches a corner C2 (start position P1), the concurrent six-axes cylindrical interpolation instruction (G12) is executed subsequent to the linear interpolation instruction (G01) on the straight line L12. The concurrent six-axes cylindrical interpolation instruction is concretely executed as follows. When the torch top end portion 26a reaches a start position P1 (control coordinate position XP1, YP1, ZP1, AP1, BP1, CP1), that is, a corner arc CA2 forming the corner C2 as shown in FIG. 7 (a position P10 where the straight line L12 and the corner arc CA2 are connected with each other as shown in FIG. 7), the machining control portion 55 rotates and drives the C-axis drive motor 76F through the driving control portion 56 so as to start the rotation of the workpiece 70 (that is, the chuck 10) in the R direction. By doing so, the corner C2 of the workpiece 70 moves on a rotational arc RA2 of radius of rotation Rr as shown in FIG. 9(b) (arrow with bold line as shown in FIG. 9(b)). At this time, the workpiece 70 is rotated and driven at the C-axis angular velocity ωc such that the above-mentioned relative speed is corresponded with the feed speed Fr instructed in the machining program.

When the workpiece 70 is rotated the C-axis rotational angle θ1 in this way as shown in FIG. 9(b) (is changed into an intermediate state 72 as shown in FIG. 9(b)), the corner C2 moved along the above-mentioned rotational arc RA2 is positioned at an intermediate passage position P2 (the control coordinate position XP1, YP2, ZP2, AP1, BP1, CP2). At this time, in order to move and position the torch top end portion 26a to and at the above-mentioned position P2, synchronizing with the movement of the corner C2, the machining control portion 55 controls such that the Y-axis drive motor 76B and the Z-axis drive motor 76C are moved and driven through the driving control portion 56 as instructed by block N002 of the machining program PRO so as to position the torch top end portion 26a at the intermediate passage position P2 (the control coordinate position Xp1, Yp2, Zp2, Ap1, Bp1, Cp2).

After the passage of the intermediate passage position P2 the machining control portion 55 further drives the C-axis drive motor 76F on the basis of the end position instruction of the concurrent six-axes cylindrical interpolation instruction in block N003 of the machining program PRO so as to rotate and drive the workpiece 70 in the arrow R direction such that the C-axis rotational angle can be θ2 (π/2) (such that the workpiece 70 can be a final state 73 as shown in FIG. 9(b)), and moves and drives the Y-axis drive motor 76B and the Z-axis drive motor 76C so as to drive and control at a predetermined feed speed Fr until the position of the torch top end portion 26a and the corner C2 reach an end position P3 (the control coordinate position XP1, YP3, ZP3, AP1, BP1, CP3). Then, the torch top end portion 26a reaches a position P11 where the corner arc CA2 and the straight line L23 are connected with each other as shown in FIG. 7, so that the workpiece 70 becomes to be horizontal, facing the face S23 in the L direction on the Z-axis (that is, the concurrent six-axes cylindrical interpolation on the corner C2 finishes). Then, the corner C2 (the corner arc CA2) is cut from the position P10 to the position P11.

After finishing cutting of the corner C2 portion, the instruction (G01) is again executed between the corners C2 and C3 That is, the laser beam RZ moves on L23 at the feed speed Fr in the K direction on the Y-axis, similar to the above-mentioned straight line L12, so as to cut the workpiece 70 along the straight line L23.

When the laser beam RZ reaches a corner C3 (that is, when cutting of the straight line L23 finishes), the corner C3 (corner arc CA3) is subsequently cut by the concurrent six-axes cylindrical interpolation instruction (G12), rotating the workpiece 70. Thereafter, the laser beam RZ is successively radiated on the workpiece 70 without pausing along the machining passage of the straight line L34, a corner C4 (corner arc CA4), the straight line L41 and the corner C1 (corner arc CA1), alternately repeating the liner interpolation instruction (G01) and the concurrent six-axes cylindrical interpolation instruction (G12) so as to cut. Then, the control for machining finishes.

The concurrent six axes cylindrical interpolation instruction explained above refers to an instance of simple machining on a square pipe with the driving control in the Y-, Z-, and C-axis directions. But, the directions for controlling driving are not always the Y-, the Z-, and the C-axis. It is off course that the control of the movement and the rotation of the torch 26 in the five axes directions (X-, Y-, Z-, A-, B-axis directions) and the control of the rotation of the chuck 10 in the C-axis direction can be simultaneously executed in such a way that the driving control of the table 5 through the X-axis drive motor 76A in the X-axis direction, the driving control of the outside sleeve 12a through the A-axis drive motor 76D in the A-axis direction, the driving control of the inside sleeve 12b through the B-axis drive motor 76E in the B-axis direction are also used according to the machining shape of the workpiece 70.

On this occasion, the C-axis angular velocity ωc computed in step STP4 is the C-axis angular velocity ωc necessary when the torch top end portion 26a moves on the corner arcs CA1, CA2, CA3, CA4 at the feed speed Fr. The machining control portion 55 must control such that the feed speed of the torch 26 with respect to the workpiece 70 (the relative speed) is corresponded with the feed speed Fr instructed by the machining program PRO (Fr=5,000 mm/min in case of FIG. 9(c)) at the result of the control of the rotation and the movement of the torch 26 in the five axes directions (X-, Y-, Z-, A-, B-axis directions) and the control of the rotation of the chuck 10 in the C-axis direction at the time of the concurrent six-axes cylindrical interpolation instruction.

Then, the main control portion 40 makes the machining data computing control portion 57 execute a feed speed control program FCP as shown in FIG. 6 at the time of executing concurrent six-axes cylindrical interpolation instruction so as to control the above-mentioned relative speed at the time of executing concurrent six-axes cylindrical interpolation instruction.

That is, the machining data computing control portion 57 instructs the machining data computing portion 59 to compute radius of rotation Rr at the time of rotation of the workpiece 70 with the C-axis as its center at the time of execution of the concurrent six-axes cylindrical interpolation instruction in step STP101 in the feed speed control program FCP. Receiving this, the machining data computing portion 59 computes the radius of rotation Rr from the workpiece data WD input by an operator at the time of the producing of the machining program PRO. On this occasion, the workpiece 70 in the present embodiment is a square pipe, as mentioned above. So, the rotational center CT (the C-axis) is a center of gravity of the section of a rectangle, that is, the center of a diagonal line, and the radius of rotation Rr is the same value in any of the corners C1, C2, C3 and C4. In case of an irregularly shaped member having L-shaped section, for instance, but, the radius of rotation Rr is computed every each corner since it is a different value every each corner.

Subsequently, the machining data computing control portion 57 sets the feed speed Fr instructed by the machining program PRO in step STP102 as the feed speed to be controlled, and the machining data computing control portion 57 instructs the machining data computing portion 59 to compute the C-axis angular velocity ωc and the speed of the respective control axes excluding the C-axis (each axis speed) for actualizing the feed speed Fr in step STP103. Receiving this, the machining data computing portion 59 computes the speed of the respective axes, X-, Y-, Z-, A-, B-, C-axis, that is, moving speed Fx, Fy, Fz and angular velocity ωa, ωb, ωc. On this occasion, the C-axis angular velocity ωc and each axis speed excluding the C-axis Fx, Fy, Fz, ωa, ωb are computed such that the feed speed of the torch 26 with respect to the workpiece 70 (the relative speed) is corresponded with the feed speed Fr set in step STP102 by simultaneously executing the rotation of the workpiece 70 with the rotation of the C-axis and, the rotation and the driving of the control axes excluding the C-axis. Each axis speed Fx, Fy, Fz, ωa, ωb, ωc computed are stored in the machining data memory 60.

Furthermore, the machining data computing portion 59 judges as to whether or not the C-axis angular velocity ωc and the speed of each control axis excluding the C-axis Fx, Fy, Fz, ωa, ωb, computed for actualizing the feed speed Fr instructed in the machining program PRO in step STP103 exceed restricted limiting speed of each control axis (predetermined ceiling value) in steps STP105 and STP106.

That is, the machining data computing control portion 57 instructs the speed clamping judgment portion 61 to judge as to whether or not the C-axis angular velocity ωc is smaller than the C-axis maximum angular velocity ωcmax in step STP105. Receiving this, the speed clamping judgment portion 61 reads the C-axis angular velocity ωc out of the machining data memory 60 and the C-axis maximum angular velocity ωcmax (for instance, the maximum C-axis angular velocity ωc at which machining accuracy can be maintained, that is, default value) out of the driving condition memory 62 so as to judge as to whether or not the C-axis angular velocity ωc is smaller than the C-axis maximum angular velocity ωcmax. If the C-axis angular velocity ωc is bigger than the C-axis maximum angular velocity ωcmax (No of step STP105), the speed clamping judgment portion 61 transfers the judgment result to the machining data computing control portion 57. Receiving this, the machining data computing control portion 57 instructs the speed amending portion 63 to amend (clamp) the C-axis angular velocity ωc and to amend (clamp) the feed speed Fr. When a relatively big feed speed Fr is input by an operator or the corner radius Rc of a square pipe is relatively small, for instance, the C-axis angular velocity ωc may exceed the C-axis maximum angular velocity ωcmax.

In step STP106, the speed amending portion 63 receiving the above-mentioned amendment instruction firstly reads the C-axis angular velocity ωc and the C-axis maximum angular velocity ωcmax in a similar way above-mentioned so as to set a predetermined value smaller than the C-axis maximum angular velocity ωcmax (for instance, the C-axis maximum angular velocity ωcmax) as a C-axis amended angular velocity ωcmdf. And, the speed amending portion 63 changes the feed speed Fr into the amended feed speed Frmdf on the basis of the C-axis amended angular velocity ωcmdf.

After finishing the above-mentioned amendment, the speed amending portion 63 transfers the above-mentioned C-axis angular velocity ωcmdf amended and the amended feed speed Frmdf amended corresponding to the C-axis angular velocity ωcmdf amended to the machining data computing control portion 57. Receiving this, the machining data computing control portion 57 instructs the image control portion 46 to display a scope showing to an operator that the feed speed Fr is amended, and the image control portion 46 displays the scope through the display 42, and the program further proceeds to step STP107.

If the judgment is that the C-axis angular velocity ωc is smaller than the C-axis maximum angular velocity ωcmax in step STP105 (Yes of step STP105), the speed clamping judgment portion 61 transfers the judgment result to the machining data computing control portion 57 without amending the C-axis angular velocity ωc, and the program proceeds to step STP107 in a similar way.

In step STP107, the machining data computing control portion 57 instructs the speed clamping judgment portion 61 to judge as to whether or not the speed of the control axes excluding the C-axis Fx, Fy, Fz, ωa, ωb, computed and determined in step STP103 is smaller than each axis maximum speed Fxmax, Fymax, Fzmax, ωamax, ωbmax (for instance, the maximum speed of each control axis Fx, Fy, Fz, ωa, ωb at which machining accuracy can be maintained). The speed clamping judgment portion 61 reads each axis speed Fx, Fy, Fz, ωa, ωb and each axis maximum speed Fxmax, Fymax , Fzmax, ωamax, ωbmax out of the data memories 55, 57 in a similar way above-mentioned so as to judge as to whether or not the X-axis moving speed Fx is smaller than the X-axis maximum moving speed Fxmax, as to whether or not the Y-axis moving speed Fy is smaller than the Y-axis maximum moving speed Fymax, as to whether or not the Z-axis moving speed Fz is smaller than the Z-axis maximum moving speed Fzmax, as to whether or not the A-axis angular velocity ωa is smaller than the A-axis maximum angular velocity ωamax, and as to whether or not the B-axis angular velocity ωb is smaller than the B-axis maximum angular velocity ωbmax. If at least one of the speed of each axis Fx, Fy, Fz, ωa, ωb is bigger than each axis maximum speed Fxmax, Fymax, Fzmax, ωamax, or ωbmax (No of step STP107), the speed clamping judgment portion 61 transfers the judgment result to the machining data computing control portion 57. The program enters into step STP104, and the machining data computing control portion 57 receiving the above-mentioned result, makes the speed amending portion 63 amend (clamp) the speed of each axis Fx, Fy, Fz, ωa, ωb exceeding each axis maximum speed, and amend (clamp) the feed speed Fr (including the case where it has been already amended in step STP105).

In step STP104, the speed amending portion 63 receiving the amendment instruction executes the processing for changing the speed of each axis exceeding the maximum speed at which amendment is necessary (the speed judged exceeding a predetermined ceiling value), such as the Y-axis moving speed Fy, into the Y-axis amended moving speed Fymdf set as a predetermined value lower than the Y-axis maximum moving speed Fymax (such as, the Y-axis maximum moving speed Fymax), or the speed amending portion 63 amends the feed speed Fr on the basis of the above-mentioned Y-axis amended moving speed Fymdf.

When the above-mentioned amendment finishes in this way, the speed amending portion 63 transfers the C-axis amended angular velocity ωcmdf and the amended feed speed Frmdf to the machining data computing control portion 57. Receiving this, the machining data computing control portion 57 makes the image control portion 46 display a scope showing to an operator that the feed speed Fr has been amended, through the display 42 in a similar way to the above-mentioned, and the program proceeds to step STP108.

If any of the speed of the respective axes Fx, Fy, Fz, ωa, ωb is smaller than the maximum speed of the axes Fxmax, Fymax, Fzmax, ωamax, or ωbmax (Yes of step STP107), the speed clamping judgment portion 61 transfers the judgment result to the machining data computing control portion 57 without amending the speed of each axis, and the program proceeds to step STP108 in a similar way.

In step STP108, the main control portion 40 instructs the laser beam condition setting portion 65 to set laser beam condition. Receiving this, the laser beam condition setting portion 65 computes the condition for outputting laser beam according to the changed feed speed of each axis so as to output to the laser beam oscillation control portion 66. The laser beam oscillation control portion 66 immediately changes the condition for outputting laser beam at the time of execution of the concurrent six-axes cylindrical interpolation instruction into the condition set by the laser beam condition setting portion 65 so as to execute the concurrent six-axes cylindrical interpolation instruction. By doing so, the laser beam RZ supplied from the torch 26 at the time of execution of the concurrent six-axes cylindrical interpolation instruction is amended, fitting to feed speed Fr modified by the feed speed control program FCP, such that the corner C2 of the workpiece 70 is cut in a good condition. If the speed of each axis Fx, Fy, Fz, ωa, ωb, ωc is not amended, the condition for outputting laser beam is not changed in step STP108, and the laser beam oscillation control portion 66 continues the operation at the condition for outputting laser beam on the basis of the machining condition set in the machining program PRO.

In this way, the main control portion 40 executes the feed speed control program FCP at the time of execution of concurrent six-axes cylindrical interpolation instruction, and computes and determines the speed of the respective control axes so as to correspond the feed speed of the torch 26 with respect to the workpiece 70 (the relative speed) with the feed speed Fr instructed in the machining program PRO, and simultaneously controls the respective control axes on the basis of the speed computed and determined. At the same time, the speed computed and determined is properly amended if it exceeds a predetermined ceiling speed set concerning each control axis, such that the concurrent six-axes cylindrical interpolation instruction is properly executed.

The above-mentioned embodiment refers to the case where the corner of the workpiece 70, which section is a rectangle, is machined by concurrent six-axes cylindrical interpolation instruction. The sectional shape of the workpiece 70 is not limited to a rectangle, but it may of course be a triangle as shown in FIG. 10 or a polygon. The explanation of FIG. 10 is omitted by attaching the same number to the portion the same as one of FIG. 9.

In the laser beam machine 1 in the present embodiment, the control of the movement, the rotation and the driving of the torch 26 in the five axes directions (X-, Y-, Z-, A-, and B-axis directions) and the control of the rotation and driving of the chuck 10 in the C-axis direction are synchronized and are simultaneously controlled, so that the workpiece 70 of which sectional shape is irregular shape having a corner can be also successively machined along a machining path passing through the corner, it is not necessary to machine the workpiece 70 every each machining surface as a conventional case, and speedy machining can be actualized. Furthermore, concurrent six-axes cylindrical interpolation instruction is executed so as to correspond the feed speed of the torch 26 with respect to the workpiece 70 (the relative speed) with the feed speed Fr instructed in the machining program PRO, so that a cut face in a good condition having no surface irregularity can be made with machining while speedy machining is actualized. Besides, the above-mentioned concurrent six-axes cylindrical interpolation instruction is executed by instructing the start point P1, the intermediate point P2, the end point P3 and the feed speed in the machining program, so that a CAD/CAM unit and memory capacity for the machining program by the CAD/CAM unit are not specifically necessary, and the machining can be easily performed without specific skill. Besides, the machining on the workpiece 70 is executed at the amended speed of the respective axes ωamdf, ωbmdf, ωcmdf, Fxmdf, Fymdf, Fzmdf, so that the successive machining can be correctly executed along the machining pass passing through the corner even if the angular velocity of the respective rotational directions ωa, ωb, ωc and the moving speed in the axial directions Fx, Fy, and Fz exceed each predetermined ceiling value.

The above-mentioned laser beam machine 1 in the present embodiment refers to an instance of a simple cutting machining on a pipe having a section in the shape of a rectangle or a triangle. But, the present invention can be also applied to any type of the workpiece 70 as long as a cut face has a corner. For instance, the present invention can be also applied to the workpiece having L-shaped section wherein the internal angle of the corner of the cut face is obtuse in addition to the workpiece having a polygonal section in the shape of a pentagon or a hexagon and the workpiece having a section in the shape of a semicircle, comprised of a straight line and a curved line. Besides, the workpiece 70 is not limited to a long-shaped member, such as a pipe, but the present invention can be of course applied to the workpiece 70 where the length in the axial center direction is not long as long as a cut face has a corner.

And, the above-mentioned embodiment refers to the laser beam machine as an instance of a three dimensional linear machining apparatus, but any type of machine is available as long as the workpiece can be three-dimensionally machined therewith. The present invention can be also applied to a three dimensional plasma cutting machine and a three-dimensional gas cutting machine, for instance.

The present invention is explained on the basis of the embodiments heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. A three dimensional linear machining apparatus having means for rotating, holding and driving, by which a workpiece a sectional shape of which has a corner, can be held with a first axis as its center and said workpiece can also be held so as to be freely angularly rotated, and driven in a first rotational axis direction with said first axis, and a machining portion provided so as to be freely moved and driven in said first axial direction and second and third axial directions orthogonal to each other so as to be freely angularly rotated and driven in second and third rotational axis directions with said second and third axes as their centers with respect to said workpiece held by said means for rotating, holding and driving, comprising:

rotation control means, for controlling said means for rotating, holding and driving so that said workpiece is rotated a predetermined angle around said first axis and so that said corner to be machined can be moved along a rotational arc having a predetermined rotational radius;

means for controlling said machining portion so as to move along said rotational arc having said predetermined rotational radius, synchronizing with rotation of said corner to be machined;

means for computing axial speed, for computing angular velocity in said first, second and third rotational axis directions and moving speed in said first, second and third axial directions so as to correspond a feed speed of said machining portion with respect to said workpiece with feed speed instructed in a machining program at the time of execution of a concurrent six axes cylindrical interpolation instruction in which a feed speed at the time of machining on said corner of said workpiece is instructed in said machining program; and means for executing machining on said corner of said workpiece by simultaneously controlling said first, second and third axes and said first, second and third rotational axes on the basis of said angular velocity in said first, second and third rotational directions and said moving speed in said first, second and third axial directions, which are computed by said means for computing axial speed.

2. The three dimensional linear machining apparatus according to claim 1, further comprising:

means for judging ceiling speed, for judging whether or not said angular velocity in said first, second and third rotational axis directions and said moving speed in said first, second and third axial directions computed by said means for computing axial speed, exceed a predetermined ceiling value set for each axis; and means for amending speed judged exceeding said ceiling value when said means for judging ceiling speed judges that said angular velocity in said first, second and third rotational axis directions and said moving speed in said first, second and third axial directions exceed said predetermined ceiling value set for each axis;

wherein said means for executing machining executes machining on said corner of said workpiece at speed amended by said means for amending speed.

3. The three dimensional linear machining apparatus according to claim 2, wherein said three dimensionally linear machining apparatus is a laser beam machine, said apparatus further comprising means for changing a condition for outputting the laser beam radiated from said machining portion of said laser beam machine when said speed of said each axis is amended by said means for amending speed.

4. A three dimensional linear machining apparatus having a unit for rotating, holding and driving, by which a workpiece, a sectional shape of which has a corner, can be held with a first axis as its center and said workpiece also held so as to be freely angularly rotated, and driven in a first rotational axis direction with said first axis, and a machining portion provided so as to be freely moved and driven in said first axial direction and second and third axial directions orthogonal to each other and so as to be freely angularly rotated and driven in second and third rotational axis directions with said second and third axes as their centers with respect to said workpiece held by said unit for rotating, holding and driving, comprising:

a rotation control unit, for controlling said unit for rotating, holding and driving so that said workpiece is rotated a predetermined angle around said first axis and so that said corner to be machined of said workpiece can be moved along a rotational arc having a predetermined rotational radius;

a unit for controlling said machining portion to move along said rotational arc having said predetermined rotational radius, synchronizing with rotation of said corner to be machined; and a unit for computing axial speed, for computing angular velocity in said first, second and third rotational axis directions and moving speed in said first, second and third axial directions so as to correspond a feed speed of said machining portion with respect to said workpiece with feed speed instructed in a machining program at the time of execution of a concurrent six axes cylindrical interpolation instruction in which a feed speed at the time of machining said corner of said workpiece is instructed in said machining program; and a unit for executing machining said corner of said workpiece by simultaneously controlling said first, second and third axes and said first, second and third rotational axes on the basis of said angular velocity in said first, second and third rotational directions and said moving speed in said first, second and third axial directions, which are computed by said unit for computing axial speed.

5. The three dimensional linear machining apparatus according to claim 4, further comprising:

a unit for judging ceiling speed, for judging whether or not said angular velocity in said first, second and third rotational axis directions and said moving speed in said first, second and third axial directions computed by said unit for computing axial speed, exceed a predetermined ceiling value set for each axis; and a unit for amending speed judged exceeding said ceiling value when said unit for judging ceiling speed judges that said angular velocity in said first, second and third rotational axis directions and said moving speed in said first, second and third axial directions exceed said predetermined ceiling value set for each axis;

wherein said unit for executing machining executes machining on said corner of said workpiece at speed amended by said unit for amending speed.

6. The three dimensional linear machining apparatus according to claim 5, wherein said three dimensionally linear machining apparatus is a laser beam machine, and wherein the apparatus further comprises a unit for changing condition for outputting the laser beam radiated from said machining portion of said laser beam machine when said speed of said each axis is amended by said unit for amending speed.

* * * * *